May 8, 1962 H. H. GÜNTHARD ET AL 3,034,039
DEVICE FOR ASCERTAINING NUCLEAR INDUCTION SPECTRA
Filed Feb. 5, 1958 2 Sheets-Sheet 1

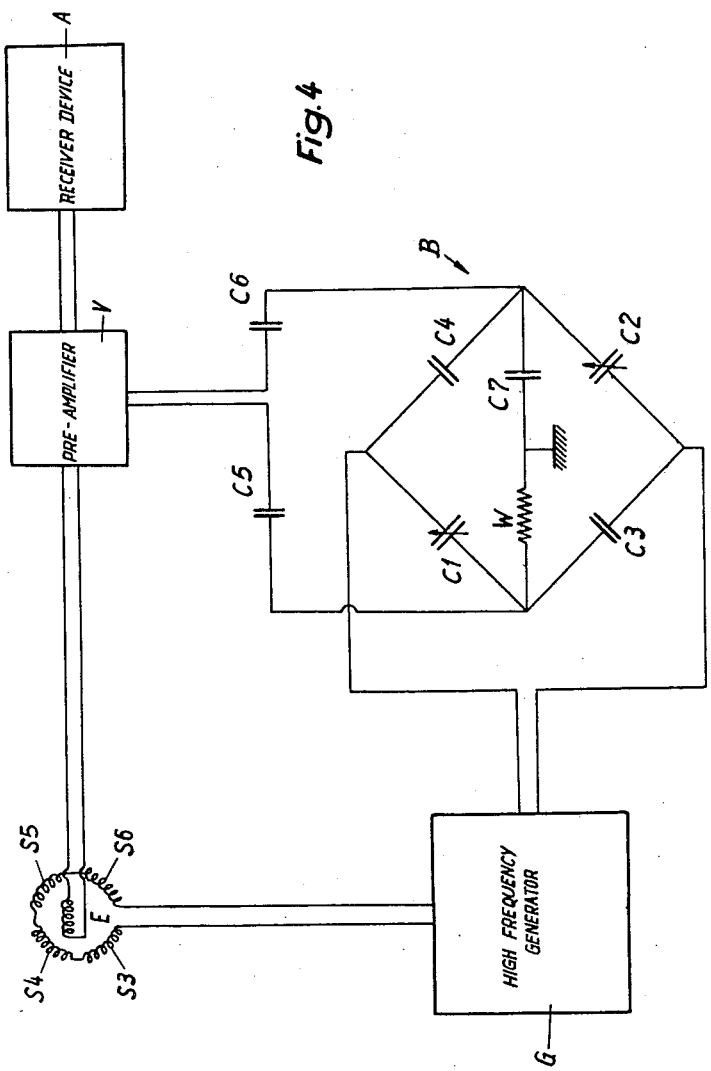

3,034,039
DEVICE FOR ASCERTAINING NUCLEAR
INDUCTION SPECTRA
Hans Heinrich Günthard and Johann Jaroslav Primas,
Zurich, Switzerland, assignors to Trüb, Täuber & Co.,
A.G., Zurich, Switzerland
Filed Feb. 5, 1958, Ser. No. 713,329
Claims priority, application Switzerland Apr. 18, 1957
5 Claims. (Cl. 324—.5)

The present invention relates to the method for measuring the induction spectra of nuclei as published by Bloch in his U.S. Patent No. 2,561,489, which is briefly summed up hereinafter:

A test specimen P of the material is located in a homogeneous direct magnetic field $H_0$ which in FIG. 1 is assumed to be perpendicular to the plane of the drawing and is indicated by crosses. The magnetic moments of the atom nuclei contained in the specimen perform a precession about axes parallel to $H_0$, and are excited to resonance effects by an alternating magnetic field $H_1$ which is perpendicular to $H_0$. The precessions of the atom nuclei induce a voltage in a receiver coil E the axis of which is perpendicular both to $H_0$ and to $H_1$, which voltage after amplification, rectification and demodulation can be measured in a certain frequency range of the alternating exciter field $H_1$ with a constant direct field $H_0$, or over a major part of $H_0$ at a constant frequency of $H_1$. At certain values of the frequency of the alternating field $H_1$, and at certain values of the magnitude of $H_0$ the induction voltage has resonance values, the position of the resonance points in the induction spectra of the nuclei thus obtained being characteristic for the material of the test sample.

The resolving power of a device for measuring the induction spectra of nuclei is defined by the ratio of the minimum width of line of the signal from the nuclei as determined by the device, measured in units of frequency or of field strength, to the frequency of the alternating field $H_1$, or strength of the direct field $H_0$. A number of parameters affect the power of resolving. Decisive, however, are the homogeneity of the $H_0$-field in the range of the test specimen, and the ratio of (1) the voltage induced in the coil E by the moments of the nuclear precessions to (2) the "background noise" voltages arising in the coil E. In addition to these "background noise" voltages yet other voltages occur on the coil E which must not be confused with the nuclear signal. Such voltages may be generated either by a direct inductive or capacitative transmission from the transmitter coils serving for the generation of the alternating field $H_1$ upon the receiver coil ("leakage voltage") or by the action of external fields. While the latter can be screened off or compensated for in a known manner, the aforesaid "leakage voltage" which is characterised by the frequency of the $H_1$-field, will now be considered more closely.

The $H_0$-field, which for nuclear resonance tests in general amounts to several thousand Gauss or more, is usually generated by a permanent magnet or an electromagnet. The homogeneity of the $H_0$-field in the range of the test specimen is assured by the properties and shape of the pole shoes of this $H_0$-magnet as well as by certain conventional correction systems which additionally homogenize the $H_0$-field in the range of the specimen. The $H_0$-field conveniently has an axial symmetry. The elements which have to be inserted into the air gap of the $H_0$-magnet are usually combined into a system denoted as the test specimen head; this test specimen head is in general fixed to an arm and can be inserted by a mechanical device into the air gap and there moved in three co-ordinate directions in order to be able to bring the specimen to the place of optimum homogeneity of the $H_0$-field.

In the test specimen head there are usually built-in: the coils for generating the alternating $H_1$-field ("transmitter coils"), the receiver coil, the necessary electrical leads, and the specimen holder with the specimen. The specimen lies generally symmetrically to the receiver coil.

The arrangement of the transmitter and receiver coils will now be considered. A simple, often used arrangement is shown in FIG. 2. The transmitter coils $S_1$ and $S_2$ through which flows one and the same high frequency current in the same sense, generate the alternating field $H_1$ perpendicular to the axis of the receiver coil E. The axes of the three coils $S_1$, $S_2$ and E lie in a mirror symmetry plane of the arrangement, and the plane perpendicular to the said plane and including the axis of the coil E is likewise a mirror symmetry plane. Since the transmitter coils lie perpendicular to the receiver coil, no voltage should be induced in the latter by them. This however is only approximately correct. In reality nevertheless an induction voltage will be generated in E, for the following reasons:

(1) By departures from the mirror symmetry of the coils $S_1$ and $S_2$ or by a deviation of the axes of $S_1$ and $S_2$ from the perpendicular to the axis of coil E a component of the field $H_1$ parallel to the axis of E is generated which induces a voltage in E.

(2) Also the leads to the transmitter coils produce a component of $H_1$ in the direction of the axis of E. On the other hand the leads to the receiver coil E may receive an induction by the main component of the $H_1$-field.

(3) By the materials used for the attachment of the coils and of the test specimen carrier the $H_1$-field is distorted, and an induction may be caused in the receiver coil.

(4) Between the transmitter coils and the receiver coil there exists a capacitive coupling which in the case of the arrangement according to FIG. 2 is electrically asymmetrical and generates yet another voltage in the receiver coil E.

These leakage voltages in the receiver coil are partly in phase with and partly 90° offset from the signal voltage induced by the atom nuclei, but all of them have the same frequency as the latter; all of them are denoted in the pertinent art by the comprehensive English term of "leakage" which has become usual for them.

Owing to the smallness of the signal voltage in the coil E this leakage plays a great part, its amplitude in an arrangement according to FIG. 2 far exceeding that of the signal voltage. A partial compensation of the leakage can be attained in a known manner by moveable metal screens (paddles) which are disposed transversely of the $H_1$-field and by their position are capable of varying the $H_1$-components. This often used device considerably reduces the leakage. Nevertheless it is necessary to separate the leakage voltage from the signal voltage by means of comparatively rather involved electrical wiring arrangements.

The presence of asymmetrically formed elements in the test specimen head has the unfavorable effect of diminishing the homogeneity of the $H_0$-field, whereby the resolving power of the device is adversely affected. In this sense also the aforesaid paddles for the compensation of the leakage have a detrimental effect on the $H_0$-field.

The present invention has the main object of increasing the resolving power of such devices, and of facilitating the attaining of such resolving power by improving the mechanical stability thereof.

With this and other objects in view we provide a device for ascertaining nuclear spectra by the resonance method, comprising in combination: magnetic means producing a direct magnetic field, a test specimen head arranged in the said direct magnetic field, at least four transmitter coils arranged in the said specimen head in $D_{2h}$ symmetry about an axis parallel to the said direct magnetic field and forming a mechanical unit with the said test specimen head rotatable about the said axis relative to the said magnetic means, external electrical means electrically connected to the said transmitter coils in such a manner as to generate two magnetic circuits of mirror symmetry to one another therein, a receiver coil mounted within the said direct magnetic field and the said alternating magnetic fields with its axis perpendicular to both the direct and alternating fields, and means for measuring the voltage induced in the said receiver coil.

The aforesaid "$D_{2h}$ symmetry" is well known in the art as meaning a symmetry with three mirror planes perpendicular to one another.

In order that these and other features and objects of our said invention may be clearly understood an embodiment thereof will now be described by way of example with reference to FIGS. 3 and 4 of the accompanying drawings, wherein such a device is illustrated to the extent necessary for understanding the invention:

FIG. 4 shows the general wiring diagram of the device including a particularly simple leakage compensation bridge.

Figure 3:
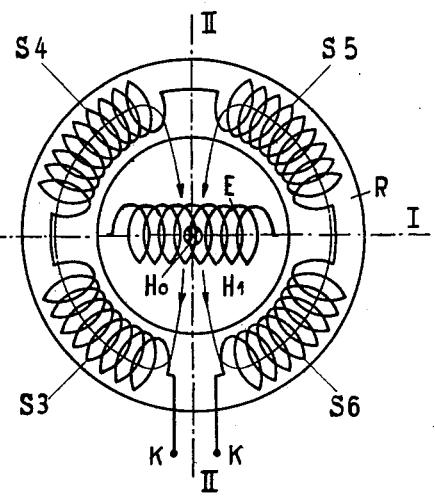
FIG. 3 shows the test specimen head.

The test specimen head diagrammatically illustrated in FIG. 3 comprises four transmitter coils $S_3$, $S_4$, $S_5$ and $S_6$, which are embedded in a ring R consisting of cast acrylic resin known under the registered trademark "Plexiglas," namely in such a manner that the centre lines of their windings lie in a common circle. These coils are connected with one another by the said ring into a mechanical unit and are arranged in a mirror symmetry to the plane of the drawing as well as to the planes I—I and II—II which are perpendicular to the plane of the drawing and to one another. The ring with the coils is rotatable about its own axis, which is parallel to the homogeneous static $H_0$-field. The coils are fed with a high frequency current supplied to the terminals K. It will be clear from FIG. 3 that in this manner two magnetic circuits are formed in mirror-symmetry to the plane II—II, whose parts passing through the receiver coil E from the alternating field $H_1$. By turning the ring R with the coils $S_3$–$S_6$ the field $H_1$ can be readily adjusted accurately perpendicular to the axis of the coil E.

Figure 1:
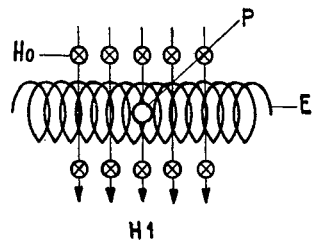
FIG. 1 shows the prior art concept of the cross fields method for measuring induction spectra of nuclei.
Figure 2:
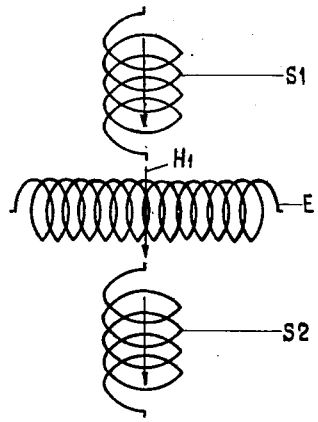
FIG. 2 shows the prior art concert of a coil arrangement for obtaining crossed fields.

The whole arrangement can moreover be produced with great accuracy. A slight inaccuracy in the position of a coil in the circumferential direction of the ring moreover has a much smaller adverse effect on $H_1$ than a deviation of equal magnitude of the coils $S_1$ and $S_2$ from the mirror symmetry to one another in the case of FIG. 2. The radial co-ordinates of the ring and coils according to FIG. 3 can be kept particularly easily in practice with great accuracy. The capacitive coupling between E and the four coils $S_3$–$S_6$ is abolished in the first approximation by the symmetry of the coils $S_3$ and $S_5$, and $S_4$ and $S_6$, respectively.

This arrangement permits a considerable reduction of the leakage. It is very convenient when the materials of the ring R and of the coils $S_3$–$S_6$ have at least approximately the same magnetic susceptibility, this being the case e.g. with Plexiglas and electrolyte copper.

In the coil head according to FIG. 3 the provision of compensating screens (paddles) is not necessary and on the contrary should be obviated because of the asymmetry thereof. The remaining leakage can easily be reduced far below the threshold of the resonance signals by means of a simple compensating bridge B (see FIG. 4).

In FIG. 4, G denotes a high frequency generator ("transmitter") which supplies a current to the coils $S_3$–$S_6$ of the test specimen head. The receiver coil E is connected through a pre-amplifier V with a receiver apparatus A, wherein the high frequency voltage is rectified, demodulated and measured, indicated and/or recorded. The voltage supplied by the transmitter G is passed to two opposite corner points of a capacitive Wheatstone bridge B having two variable condensers $C_1$ and $C_2$ in two opposite branch circuits, and two fixed condensers $C_3$ and $C_4$ in the two other branch circuits. The two other corner points of the bridge are connected through fixed condensers $C_5$, $C_6$ with the pre-amplifier V. A resistor W and a condenser $C_7$ are connected in series between the starting points of the bridge.

By means of the condensers $C_1$ and $C_2$ the amplitude and phase of the voltage is supplied by the bridge B to the pre-amplifier in such a manner that the signal indicated by the receiver apparatus A between the resonance points practically vanishes, i.e. any small "leakage"-voltage in the receiver coil is accordingly completely compensated.

The conventional means for generating the direct field $H_0$ and the means for varying the field strength of this direct field or for varying the frequency of the transmitter G are not shown in FIG. 4.

The resolving power of the device described is higher than that of the devices hitherto known, and the stability of the test specimen head facilitates quite considerably the attaining of this resolving power as compared with known devices.

It is clear that more than four coils may be arranged with $D_{2h}$ symmetry if desired.

While we have herein described and illustrated in the accompanying drawings what may be considered a typical and particularly useful embodiment of our said invention we wish it to be understood that we do not limit ourselves to the particular dimensions and details described and illustrated, for obvious modifications will occur to a person skilled in the art.

What we claim as our invention and desire to secure by Letters Patent is:

1. A device for ascertaining nuclear induction spectra by the resonance method comprising in combination: magnetic means producing a direct magnetic field, a test specimen head arranged in the said direct magnetic field, at least four transmitter coils arranged in the said test specimen head in a symmetry with three mirror planes perpendicular to one another about an axis parallel to the said direct magnetic field and forming a mechanical unit with the said test speciment head rotatable about the said axis relative to the said magnetic means, external electric means electrically connected to the said transmitter coils in such a manner as to produce two magnetic circuits of mirror symmetry to one another producing together an alternating magnetic field with its axis perpendicular to the direct magnetic field therein: a receiver coil mounted within the said direct magnetic field and the said alternating magnetic fields with its axis perpendicular to both the direct and alternating fields, and means for measuring the voltage induced in said receiver coil.

2. A device as claimed in claim 1 wherein the said four transmitter coils are arranged with their center axes in a circle concentric with the said axis parallel to the direct magnetic field.

3. A device as claimed in claim 2 wherein the said test specimen head comprises an insulating ring, the said four transmitter coils being embedded in the said ring.

4. A device as claimed in claim 3 wherein the material of the said transmitter coils and the material of the said insulating ring have substantially the same magnetic susceptibility.

5. A device for ascertaining nuclear induction spectra by the resonance method, comprising in combination: magnetic means producing a dierct magnetic field, a test specimen head arranged in the said direct magnetic field, at least four transmitter coils arranged in the said test specimen head in a symmetry with three mirror planes perpendicular to one another about an axis parallel to the said direct magnetic field and forming a mechanical unit with the said test specimen head rotatable about the said axis relative to the said magnetic means, a high frequency generator electrically connected to the said transmitter coils in such a manner as to produce therein two magnetic circuits of mirror symmetry to one another producing together an alternating magnetic field with its axis perpendicular to the direct magnetic field, a receiver coil mounted within the said direct magnetic field and the said alternating magnetic fields with its axis perpendicular to both the direct and alternating fields, a pre-amplifier having an input and an output, the input of the said pre-amplifier being electrically connected to the said receiver coil, a receiver device connected to the output of the said pre-amplifier, and a Wheatstone bridge having two of its opposite corners connected to the output of the said pre-amplifier and the two other opposite corners connected to the said high frequency generator for the purpose of compensating any "leakage"-voltage induced in the said receiver coil.

References Cited in the file of this patent
UNITED STATES PATENTS 2,908,858  Nelson _____ Oct. 13, 1949
2,975,384  Geiser _____ Mar. 14, 1961

OTHER REFERENCES

Staub et al.: Helvetica Physica Acta, vol. 23, 1950, pages 63 to 92.